US009032706B2

(12) United States Patent
Marshall

(10) Patent No.: US 9,032,706 B2

(45) Date of Patent: May 19, 2015

(54) COMPOSITE FAN CASE WITH INTEGRAL CONTAINMENT ZONE

(75) Inventor: Andrew R. Marshall, Grand Valley (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1183 days.

(21) Appl. No.: 12/239,177

(22) Filed: Sep. 26, 2008

(65) Prior Publication Data

US 2010/0077721 A1 Apr. 1, 2010

(51) Int. Cl.
*F02K 3/02* (2006.01)
*F01D 21/04* (2006.01)

(52) U.S. Cl.
CPC ........ *F01D 21/045* (2013.01); *F05D 2220/326* (2013.01); *F05D 2220/327* (2013.01); *F05D 2300/601* (2013.01); *F05D 2300/603* (2013.01); *F05D 2300/614* (2013.01)

(58) Field of Classification Search
CPC ..................................................... F01D 21/045
USPC ............. 244/53 B; 137/15.1, 15.2; 60/226.1, 60/39.091, 779; 415/9, 214.1
See application file for complete search history.

(56) References Cited

U.S. PATENT DOCUMENTS

| | | | | |
|---|---|---|---|---|
| 4,086,378 | A | 4/1978 | Kam et al. | |
| 4,438,173 | A | 3/1984 | Trost | |
| 4,902,201 | A | 2/1990 | Neubert | |
| 4,961,685 | A | 10/1990 | Neubert | |
| 5,437,538 | A | 8/1995 | Mitchell | |
| 5,447,411 | A | 9/1995 | Curley et al. | |
| 6,053,696 | A | 4/2000 | Roberts | |
| 6,814,541 | B2 * | 11/2004 | Evans et al. | 415/200 |
| 7,246,990 | B2 | 7/2007 | Xie et al. | |
| 7,338,250 | B2 | 3/2008 | Martindale et al. | |
| 7,402,022 | B2 * | 7/2008 | Harper et al. | 415/9 |
| 7,914,251 | B2 * | 3/2011 | Pool et al. | 415/9 |
| 2007/0081887 | A1 | 4/2007 | Xie et al. | |
| 2007/0280817 | A1 * | 12/2007 | Costa et al. | 415/9 |
| 2009/0155044 | A1 * | 6/2009 | Xie et al. | 415/9 |
| 2009/0277153 | A1 * | 11/2009 | Harper et al. | 60/39.091 |

* cited by examiner

*Primary Examiner* — Craig Kim

(74) *Attorney, Agent, or Firm* — Norton Rose Fulbright Canada LLP

(57) ABSTRACT

A turbofan engine which has a composite fan case surrounding a fan with a plurality of fan blades is disclosed. The composite fan case includes a containment zone having an inner fabric layer composed of resin-impregnated fibers substantially uni-axially oriented in a common angular direction corresponding to a blade release angle of the fan blades. The fan case also includes a composite outer shell and an energy absorbing core disposed radially between the inner fabric layer and the composite outer shell. The energy absorbing core includes non resin impregnated multidirectional fibers.

18 Claims, 3 Drawing Sheets

COMPOSITE FAN CASE WITH INTEGRAL CONTAINMENT ZONE

TECHNICAL FIELD

The technical field relates generally to a composite fan case for a turbofan gas turbine engine.

BACKGROUND OF THE ART

Turbofan engines typically have a fan with a hub and a plurality of fan blades disposed for rotation about a central axis. The casing surrounding the fan blades must be able to contain a broken fan blade propelled radially outwardly from the rotating hub at high speed.

Thus, the fan case includes a containment structure, which may have one of many various known designs, including designs employing composites, which can include a containment fabric layer, such as Kevlar®. The containment fabric is typically wrapped in multiple layers around a relatively thin, often penetrable supporting case, positioned between the blades and the fabric layer. Thus, a released blade will penetrate the support case and strike the fabric. The fabric deflects radially but largely remains intact to capture and contain the released blade.

However, improvements are desired.

SUMMARY

There is provided a turbofan gas turbine engine comprising: a fan including a plurality of fan blades each having a blade tip oriented at an angle relative to a transverse reference axis; and a composite fan case radially spaced outwardly from said blade tips of the fan blades and extending longitudinally from a leading to a trailing edge thereof respectively disposed on opposite sides of at least the fan blades such as to surround the fan, the fan case having a blade containment zone surrounding and in longitudinal alignment with the fan blades for containing of a fan blade in the event of a blade release, the composite fan case including a structurally supporting outer composite shell and, in at least the containment zone thereof, an intermediate energy absorbing core disposed between the outer shell and an annular inner fabric layer, the inner fabric layer having fibres substantially uni-axially oriented at a fibre lay-up angle β relative to said transverse reference axis, the fibre lay-up angle β of the fibres within the inner fabric layer being substantially equal to a blade tip release angle α of the fan blade tips.

There is also provided a method of fabricating a composite fan case for a turbofan engine comprising the steps of: determining a predicted blade release angle α of a blade tip of a fan of the turbofan engine; providing a cylindrical fan case surrounding the fan and having a containment zone, the composite fan case including a composite outer shell and, in at least the containment zone, an energy absorbing core; and forming an inner fabric layer on an inner side of the cylindrical fan case within the containment zone and overlying at least the energy absorbing core, including uni-axially orienting fibres of the inner fabric layer at a fibre lay-up angle β, the fibre lay-up angle β being substantially equal to the blade release angle α.

There is further provided a turbofan engine comprising a composite fan case surrounding a fan having a plurality of fan blades, the composite fan case including a containment zone having an inner fabric layer composed of resin-impregnated fibres substantially uni-axially oriented along a common angle corresponding to a blade release angle of the fan blades, a composite outer shell, and an energy absorbing core disposed radially between the inner fabric layer and the composite outer shell, the energy absorbing core including non resin impregnated multidirectional fibres.

Further details will be apparent from the detailed description and figures included below.

DESCRIPTION OF THE DRAWINGS

Reference is now made to the accompanying figures, in which.

DETAILED DESCRIPTION

A composite (i.e. non metallic) fan case for a gas turbine engine is described below in detail. The case includes a containment zone having an inner fabric layer including uni-axially oriented fibres. An energy absorbing core may be superposed over (i.e. radially outward from) the inner fabric layer and including non resin impregnated fibres. More particularly, the fibres of the inner fabric layer are oriented substantially along a blade release angle direction of a blade of the gas turbine engine, while the fibres of the superposed energy core portion are multidirectional.

Figure 1:
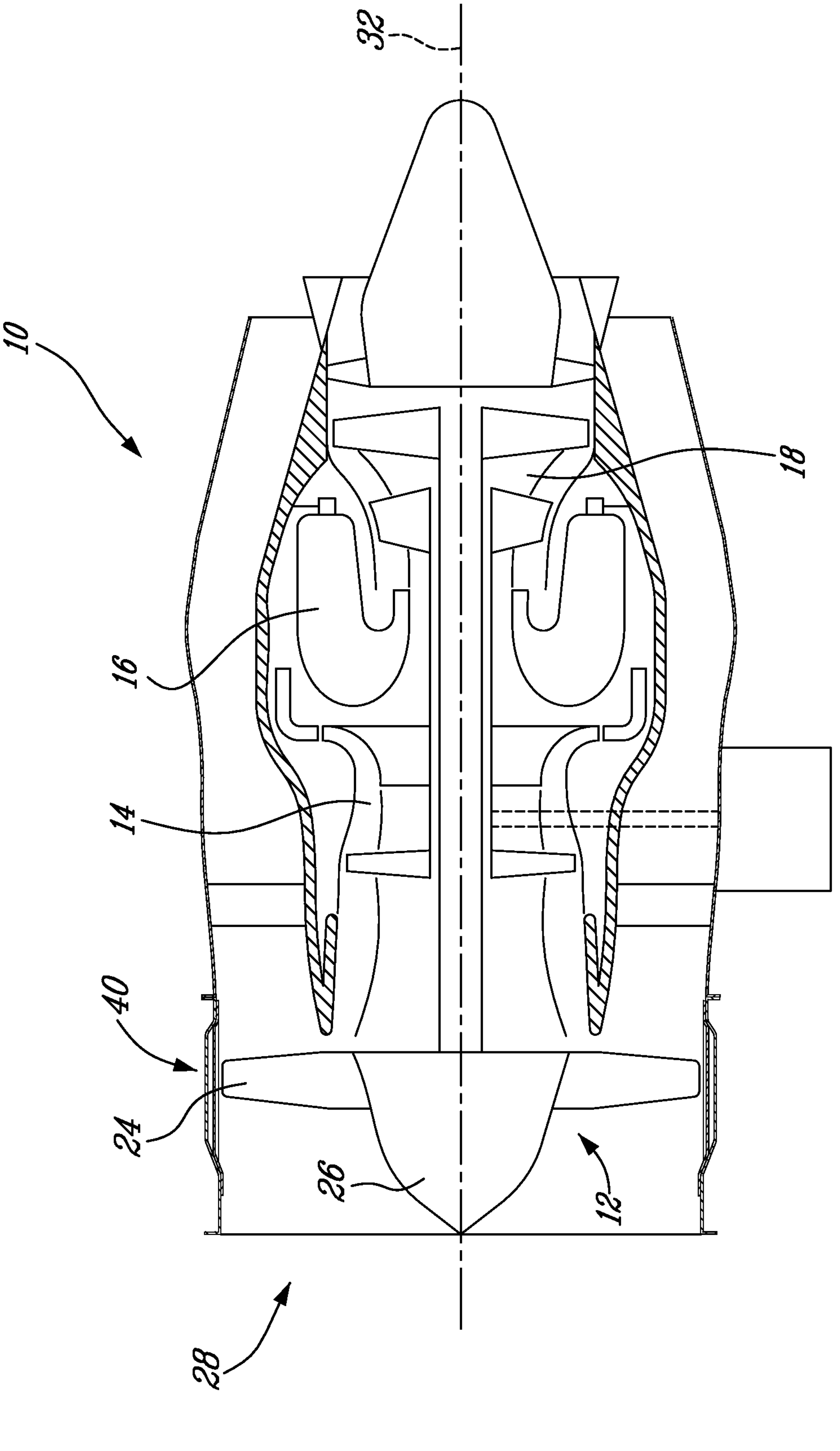
FIG. 1 is a schematic cross-sectional view of a gas turbine engine including a fan containment case.

FIG. 1 illustrates a gas turbine engine 10 of a type preferably provided for use in subsonic flight, generally comprising in serial flow communication a fan assembly 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Turbine section 18 includes at least one turbine disc having a plurality of turbine blades mounted thereto. The fan assembly 12 includes an array of fan blades 24 extending radially outward from a rotor disc 26. An annular fan case 40 surrounds the fan assembly 12. A central axis 32 runs longitudinally through the engine 10.

Figure 2:
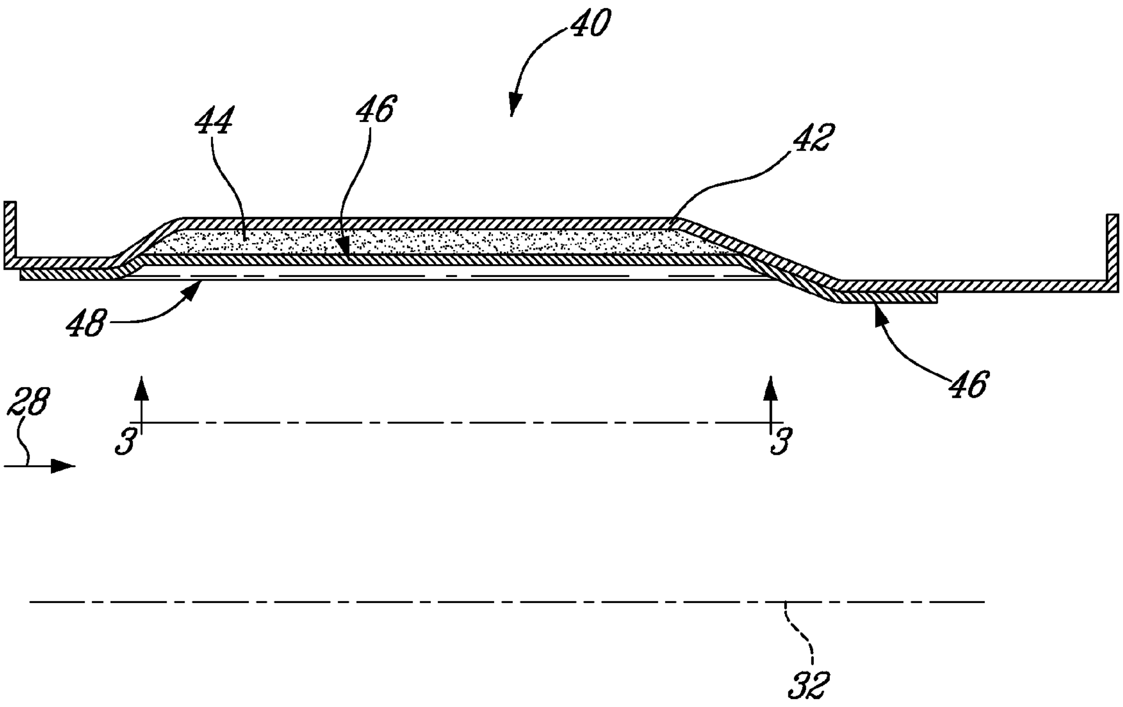
FIG. 2 is a detailed schematic cross-sectional view of a portion of the fan containment case shown in FIG. 1.
Figure 3:
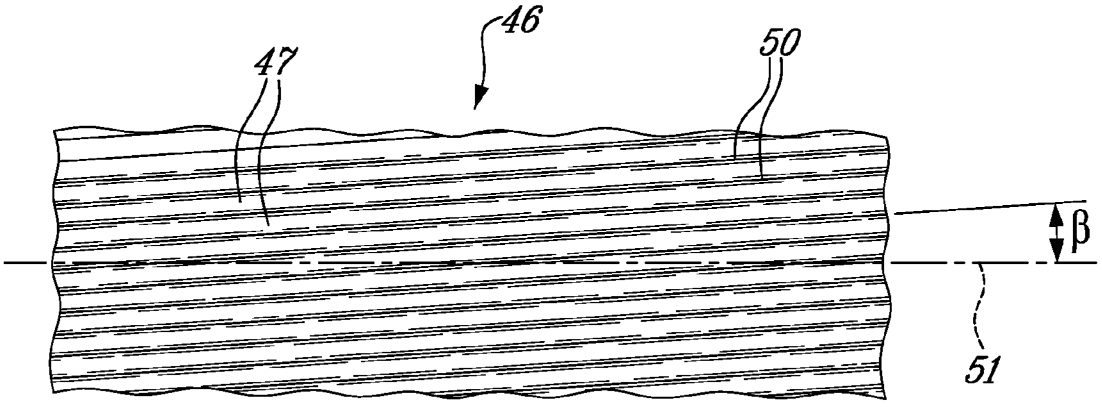
FIG. 3 is a schematic, partial inner plan view of region 3-3 of FIG. 2, showing an inner uni-axial fabric layer of the fan containment case.

FIG. 2 is a schematic partial illustration of the fan case 40 of the fan assembly 12. Referring mainly to FIGS. 2 and 3, in an exemplary embodiment, the fan case 40 includes a fan blade containment zone 41 which acts as a containment system and has a longitudinal length that is at least sufficient to enclose the fan blades 24 of the fan 12. The containment zone 41 may however also run the full length of the entire fan case 40. More specifically, the length is selected so that containment region 41 of the case 40 circumscribes a containment zone of fan assembly 12. Containment zone as used herein is defined a zone extending both axially and circumferentially around fan assembly 12 where a fan blade or blade fragment is most likely to be ejected from fan assembly 12.

In the exemplary embodiment, at least the containment zone 41 of the fan case 40 is made of a composite (i.e. non-metallic) and includes an outer shell 42, an energy absorbing core 44 that is formed by non resin impregnated multidirectional fibres, an inner uni-axial fabric layer 46, and an abradable tip clearance control layer 48, all being superposed on one another and which together define the containment fan case 40.

As seen in FIG. 3, the inner fabric layer 46 of the containment case 40 includes fibres 47 having a uni-axial orientation 50. The fibres of the inner fabric layer 46 are substantially uni-axially oriented along a lay-up angle β, which substantially corresponds to an angle α of the blades 24 of the fan assembly 12 (see FIG. 4) relative to the same transverse reference axis 51. The angle α of the blades 24 is also referred to as blade release angle α.

The fibres 47 of the inner fabric layer 46 can include strong synthetic fibres such as aramid fibres including Kevlar®. The fibres of the inner uni-axial fabric are impregnated with a resin, such as a thermosetting resin, in order to be bonded together.

Figure 4:
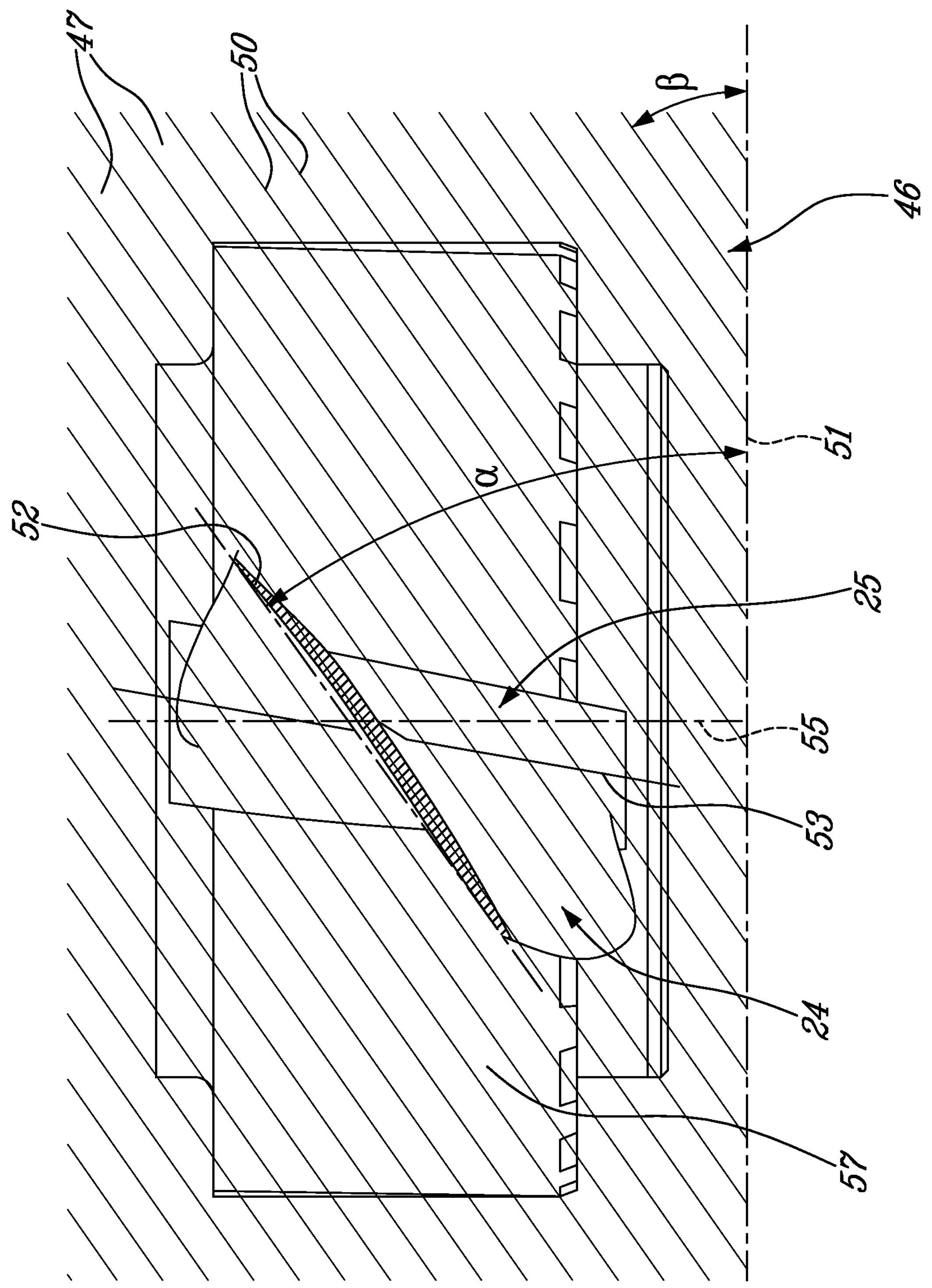
FIG. 4 is a schematic top plan view of a single blade of the fan assembly, over which the relative orientation of the inner uni-axial fabric layer of the fan containment case shown in FIG. 2 has been superimposed, for comprehension purposes.

FIG. 4 shows a top plan view of a single fan blade 24 of the fan assembly 12, over which the inner uni-axial fabric layer 46 of the fan containment case 40 has been superimposed and shown as being partially transparent, for comprehension purposes only. As such, one can see from FIG. 4 that the fibres 47 of the inner fabric layer 46 of the containment case 40 are arranged in their uni-axial orientation 50 at a lay-up angle β, which lay up angle β is substantially equal to the blade release angle α of the fan blades 24 of the fan assembly 12 about which the containment case 40 is disposed.

Therefore, the fibre lay-up angle β is determined by analysis such as to correspond to the blade angle α of a tip 52 of the fan blade 24, upon release. As can be seen in FIG. 4, the fan blade 24 is has a certain amount of twist, that is the tip 52 of the blade 24 defines an angular orientation which differs from, i.e. is not parallel to, an axis 53 of the blade root 25. Further, as can be seen, the axis 53 of the blade root 25 is also angularly disposed, i.e. is not parallel to, the fore-aft extending centerline axis 55 of the blade root platform 57. The blade root centerline axis 55 is substantially parallel to the main engine centerline axis 32.

The lay-up angle β is the angle defined between the orientation of the fibres 47 of the inner fabric layer 46 and the reference axis 51, the reference axis 51 being substantially perpendicular to the main engine centerline axis 32. For instance and without being limitative, in one example the lay-up angle β can vary between 40 and 70 degrees relatively to the reference axis 51 of the fan assembly 12. However, it is to be understood that the lay-up angle β of the fibres 47 can vary depending on a number of factors, including engine size and configuration. Regardless, the angle β of the fibres 47 will always correspond to the blade release angle α of the rotating component, such as the fan blades, that the composite case 40 surrounds.

Referring back to FIG. 2, the energy absorbing core 44 of the containment case 40, superposed on top (i.e. radially outer) of the inner fabric layer 46, includes non resin impregnated multidirectional fibres, i.e. a dry fibre core. As per the inner fabric layer 46, the energy absorbing core 44 can include strong synthetic fibres such as aramid fibres including Kevlar®.

The composite containment case 40 operates somewhat similarly to a bullet-proof vest. The combination of uni-axially oriented fibres in the inner fabric layer 46, with an overlying dry aramid multidirectional fibre core 44, favours kinetic energy absorption. The energy absorbing core 44 absorbs the primary energy of a released fan blade or blade fragment. The orientation of fibres/plies versus blade angle mismatch in the energy absorbing core 44 is used to control energy absorption. As mentioned above, the energy absorbing core 44 includes fibrous materials such as Kevlar® which contain fibres with small "hooks" which can grab onto the released blade or blade fragment to slow its rotation. Blade rotation is where most of the kinetic energy is stored in a blade. Thus slowing rotation significantly de-energizes the released blade or blade fragment.

The aligned orientation (angle β) of the fibres 47 (ex.: Aramid fibres) of the inner fabric layer 46 and the blades allows a released blade or blade fragment to enter the containment zone, without damaging the outer shell 42 and while minimizing the damage/deformation to the structural integrity of the inner shell as the initial strain to the inner shell is not transmitted circumferentially, thus maintaining an adequate case stiffness.

The outer shell 42 of the case can then be a more cost effective fabric and flexible such as, for instance and without being limitative, lower grade multidirectional tow, since the direct impact energy transferred is dissipated in the energy absorbing core 44 instead of being transferred to the outer shell 42. The fan containment case 40 thereby substantially maintains its basic structural integrity after a blade or blade fragment release event. The outer shell 42 can thus include a lower modulus fibre weave, for instance a multi-directional [epoxy/vinyl ester] prepreg of carbon/graphite/E-glass, S-glass. It is to be understood that the term "prepreg" as used herein means a composite material that is "pre-impregnated" with a resin, for example a material including a combination of un-cured resin matrix and reinforcement fibers or fabrics.

The abradable tip clearance control layer 48, which may be provided on the innermost surface of the casing 40, is made of an abradable material which helps protect the fan blades 24 rotating within the casing 40. As per other abradable coatings which are used in gas turbine engines in order permit tip clearance gap control, the abradable layer 48 can be made from any suitable abradable material such as 3M's Scotch Weld™ or a similar and/or functionally equivalent epoxy based abradable compound.

Thus, in an embodiment, the fan containment case construction is a composite lay up of non resin impregnated multidirectional fibres 44, such as dry aramid/glass fabric, sandwiched between an inner uni-directional fabric layer 46 impregnated with a resin and an outer multi-directional layer 42.

Any suitable reinforcing fibre can be used to form the inner fabric layer 46 and the energy absorbing core 44 including, but not limited to, glass fibres, graphite fibres, carbon fibres, ceramic fibres, aromatic polyamid fibres, for example poly (p-phenyletherephtalamide) fibres (Kevlar® fibres), and mixtures thereof. Any suitable resin can be used in the inner fabric layer 46, for example, thermosetting polymeric resins such as vinyl ester resin, polyester resins, acrylic resins, polyurethane resins, and mixture thereof.

In an embodiment, the inner unidirectional fabric layer 46 includes an [epoxy/vinyl ester] prepreg.

In a non-limitative embodiment, the abradable tip clearance control layer 48 has a thickness ranging between about 1.5 and 4.5 millimeters (mm), the inner fabric layer 46 has a thickness ranging between about 1 and 3 mm, the core portion 44 has a thickness ranging between about 10 and 18 mm, and the outer shell 42 has a thickness ranging between about 2 and 7 mm. The fibre density in the outer shell 42, the core portion 44, and the inner fabric layer 46 can range between about 4 and 12 [oz/sq-yd]. However, it is to be understood that the thickness, density and other properties of each of the layers of the casing 40 can vary depending on a number of design factors, including engine size and configuration for example.

The fan containment case 40 is fabricated, in an exemplary embodiment, by laying-up each of the composite layers, consecutively, about a suitable cylindrical mandrel. Each layer is formed overtop of the radially inner one by continuously applying the composite fibres/prepreg and/or resin (when used), thereby bonding each layer with the next to create an integrally formed composite fan case. The containment zone 44 is sealed within an impervious skin during lay-up to ensure that it remains dry during the resin infusion process or to prevent bleed through during prepreg cure.

The composite fan case 40 described above is relatively light weight, provides a cost effective containment system, and provides a better vibration and sound damping structure over a hard walled composite. The primary containment is provided with an integral reinforcing fibre core 44 and the uni-axial inner tow 46 to direct the blades into the optimized containment zone. The uni-axial inner tow 46 potentially catches and restrains the blade fragments from falling back into the gas path and following blades.

The above description is meant to be exemplary only, and one skilled in the art will recognize that changes may be made to the embodiments described without departing from the inventions disclosed. Still other modifications which fall within the scope of the present invention will be apparent to those skilled in the art, in light of a review of this disclosure, and such modifications are intended to fall within the appended claims.

The invention claimed is:

1. A turbofan gas turbine engine comprising:

a fan including a plurality of fan blades each having a blade tip oriented at an angle relative to a transverse reference axis; and a composite fan case radially spaced outwardly from said blade tips of the fan blades and extending longitudinally from a leading to a trailing edge thereof respectively disposed on opposite sides of at least the fan blades such as to surround the fan, the fan case having a blade containment zone surrounding and in longitudinal alignment with the fan blades for containing of a fan blade in the event of a blade release, the composite fan case including a structurally supporting outer composite shell and, in at least the containment zone thereof, an intermediate energy absorbing core having multidirectional fibres disposed between the outer shell and an annular inner fabric layer, the inner fabric layer having unidirectional fibres substantially uni-axially oriented at a fibre lay-up angle β relative to said transverse reference axis, the fibre lay-up angle β of the fibres within the inner fabric layer being equal to a blade tip release angle α of the fan blade tips, the blade tip release angle α being also measured relative to said transverse reference axis, both the fibre lay-up angle β and the blade tip release angle α being less than ninety degrees relative to said transverse reference axis.

2. A turbofan engine case as claimed in claim 1, wherein the energy absorbing core is a dry system in that the multidirectional fibres of the energy absorbing core are non resin-impregnated.

3. A turbofan engine as claimed in claim 1, wherein the composite fan case includes an abradable tip clearance control layer disposed on the inner fabric layer adjacent to the fan blade tips.

4. A turbofan engine as claimed in claim 1, wherein the fibre lay-up angle β ranges between 40° and 70°.

5. A turbofan engine as claimed in claim 1, wherein the fibres of at least one of the inner fabric layer and the energy absorbing core include aramid fibres.

6. A turbofan engine as claimed in claim 5, the fibres of at least one of the inner fabric layer and the energy absorbing core comprise Kevlar® fibres.

7. A turbofan engine as claimed in claim 1, wherein the fibres of the inner fabric layer are impregnated with a resin.

8. A turbofan engine as claimed in claim 7, wherein the resin is a thermosetting resin.

9. A turbofan engine as claimed in claim 1, wherein the composite outer shell is composed of multi-directional fibres pre-impregnated with resin.

10. A turbofan engine as claimed in claim 9, wherein the multi-directional fibres of the outer shell include at least one of carbon, graphite, E-glass and S-glass fibres.

11. A turbofan engine comprising:

a fan rotor carrying a plurality of radially extending fan blades; and a cylindrical composite fan case surrounding the rotor and spaced radially outward from tips of the fan blades, the fan case having a containment zone including an energy absorbing core disposed between a composite outer shell and an inner fabric layer, the energy absorbing core having multidirectional fibres, the inner fabric layer having unidirectional fibres which are all substantially uni-axially oriented in a common fibre lay-up angle β relative to a transverse reference axis, the fibre lay-up angle β corresponding to a blade tip release angle α of the tips of the fan blades, the blade tip release angle α being also measured relative to said transverse reference axis, both the fibre lay-up angle β and the blade tip release angle α being less than ninety degrees relative to said transverse reference axis.

12. A turbofan engine as claimed in claim 11, wherein the uni-axially oriented fibres of the inner fabric layer are impregnated with a resin and the multidirectional fibres of the energy absorbing core are non resin impregnated.

13. A turbofan engine as claimed in claim 11, wherein the fibre lay-up angle β is between 40° and 70°.

14. A turbofan engine as claimed in claim 11, wherein an abradable layer is disposed on the inner fabric layer facing the fan blades, the abradable layer providing tip clearance control.

15. A method of fabricating a composite fan case for a turbofan engine comprising the steps of:

determining a predicted blade release angle α of a blade tip of a fan of the turbofan engine;

providing a cylindrical fan case surrounding the fan and having a containment zone, the composite fan case including a composite outer shell and, in at least the containment zone, an energy absorbing core having multidirectional fibres; and forming an inner fabric layer on an inner side of the cylindrical fan case within the containment zone and overlying at least the energy absorbing core, including uni-axially orienting unidirectional fibres of the inner fabric layer at a fibre lay-up angle β, the fibre lay-up angle β being equal to the blade release angle α, both the fibre lay-up angle β and the blade release angle α being less than ninety degrees relative to a transverse reference axis.

16. A method as claimed in claim 15, wherein the step of providing further comprising forming the energy absorbing core using non resin impregnated multidirectionally oriented fibres.

17. A method as claimed in claim 15, further comprising impregnating the uni-axially orienting fibres of the inner fabric layer with resin.

18. A turbofan engine comprising a composite fan case surrounding a fan having a plurality of fan blades, the composite fan case including a containment zone having an inner fabric layer composed of resin-impregnated unidirectional fibres substantially uni-axially oriented along a common angle corresponding to a blade release angle of the fan blades, a composite outer shell, and an energy absorbing core disposed radially between the inner fabric layer and the composite outer shell, the energy absorbing core including non resin impregnated multidirectional fibres, both the common angle and the blade release angle being less than ninety degrees relative to a transverse reference axis.

* * * * *